April 4, 1961  F. K. WALPOLE  2,977,995
PIPE PATCH CLAMP
Filed June 30, 1959  2 Sheets-Sheet 1
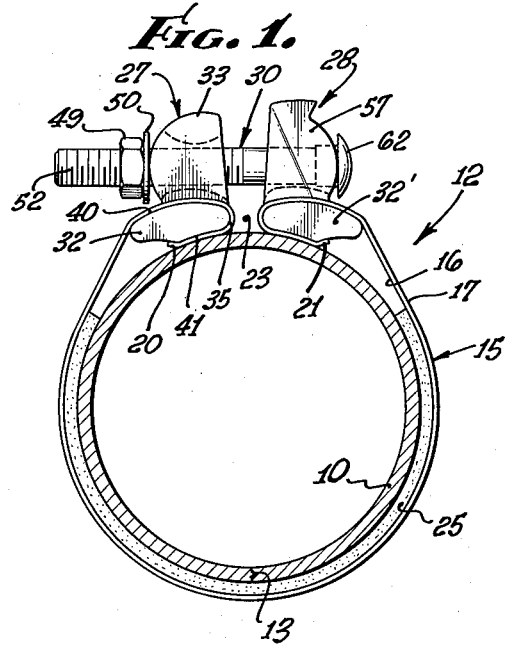
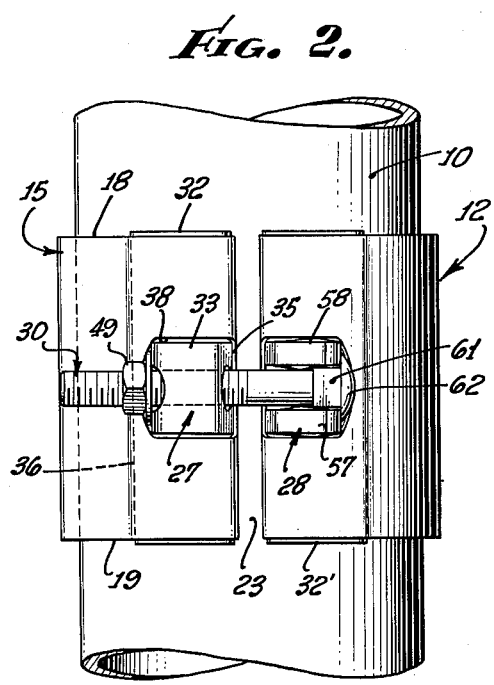
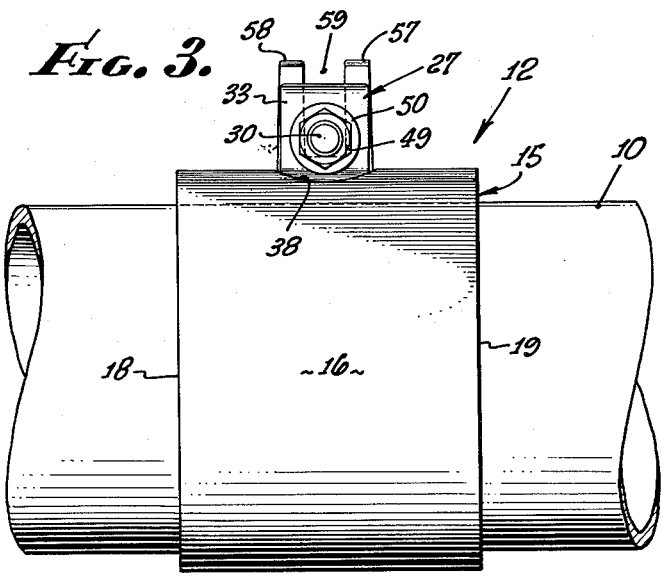
INVENTOR.
FLOYD K. WALPOLE
BY Huebner & Worrel
ATTORNEYS.

April 4, 1961 F. K. WALPOLE 2,977,995
PIPE PATCH CLAMP
Filed June 30, 1959 2 Sheets-Sheet 2
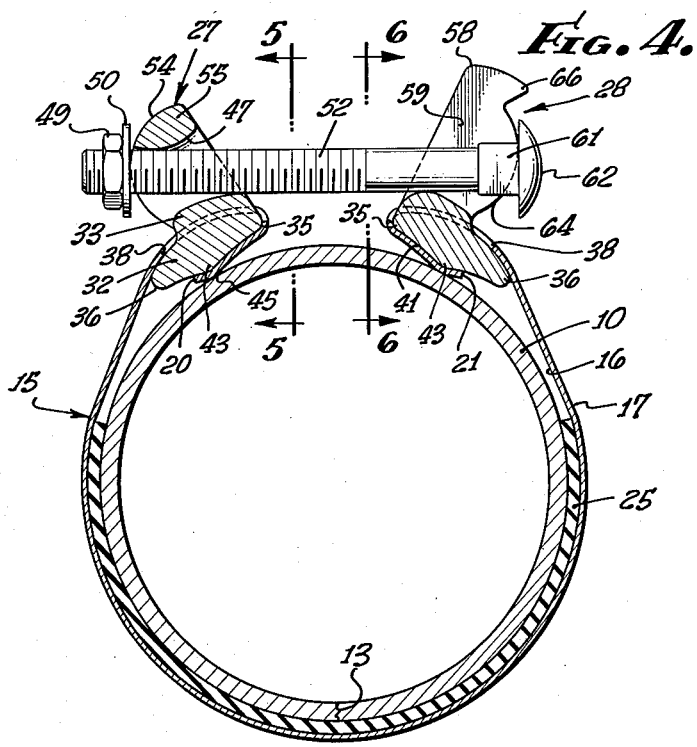
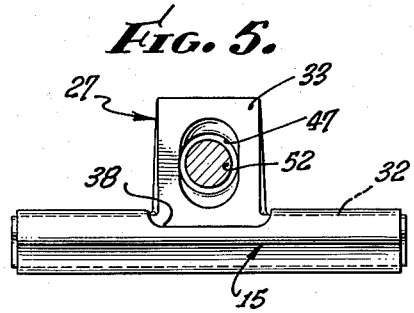
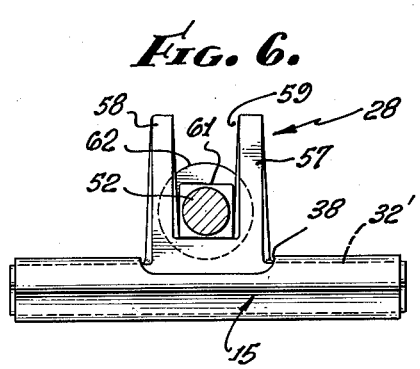
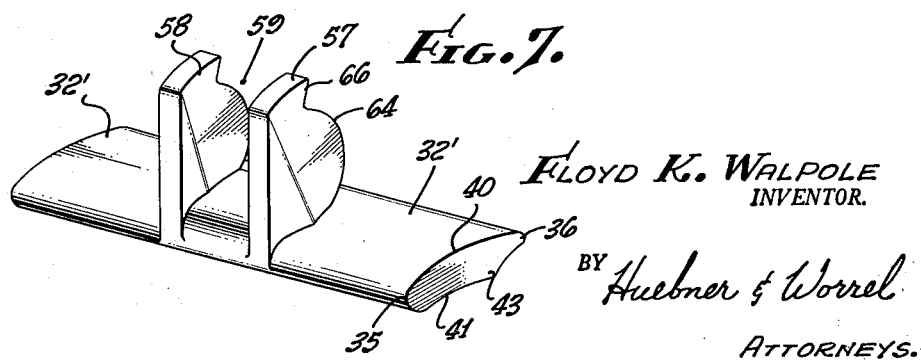
Floyd K. Walpole
INVENTOR.
BY Huebner & Worrel
ATTORNEYS.

United States Patent Office 2,977,995
Patented Apr. 4, 1961

2,977,995
PIPE PATCH CLAMP
Floyd K. Walpole, Granada Hills, Calif., assignor to Aeroquip Corporation, Jackson, Mich., a corporation of Michigan
Filed June 30, 1959, Ser. No. 823,871
9 Claims. (Cl. 138—99)

This invention relates generally to band clamps which are especially well suited for adaptation for use to repair or patch a pipe.

Clamps of the general type to which this invention relates are usually employed with an elastomer sheet serving as a patch to cover a leak in a pipe or tubing. The patch is pressed tight over the area of the leak by a band or strap of the clamp arranged to encircle the pipe, the ends of the strap being held by terminal lugs which are drawn toward each other as with a bolt. Patch clamps of that type are simple and easy to install. In instances where they function properly, they not only serve well for making emergency repairs but also serve for permanent repair purposes thus to avoid costly replacement of pipe and plant shut-down time.

In conventional clamps for patching a pipe the tightening force applied to the draw bolt is partially expended in resultant components of force which produce distortional strains in the bolt, tending to bind and bend the bolt and tending to urge the lugs inwardly to dig into or gall the pipe surfaces with the result that a greater tightening force is required to be applied to the bolt to provide a given pressure upon the patch. Then, too, as the lugs are being drawn toward each other, they must necessarily slide in a direction circumferentially on the outside surface of the pipe, but because the tightening force urges the lugs in a direction of digging into the pipe surface, slippage of the lugs on the pipe becomes progressively more difficult as bolt tension is increased. Thus, when the bolt tension is at its maximum, the band tension may be far below its potential due to the binding of the lug and resultant loss in efficiency.

It is an object of this invention to provide a new construction for a clamp of the above mentioned character which is designed to substantially reduce loss in efficiency which would otherwise result from bending and binding of the bolt and the lug digging in components of force mentioned above.

A general object of this invention is to provide an improved clamp of the above mentioned general type which is rugged in construction, efficient in operation, and reliable in service.

Further objects and advantages of the invention will appear during the course of the following part of this specification wherein the details of construction and mode of operation of a preferred embodiment of the invention are described with reference to the accompanying drawing, in which:

Fig. 1 is a cross section through a pipe showing a clamp of this invention in end elevation around the pipe, the clamp being shown in its tightened position;

Figs. 2 and 3 are a plan view and a side elevation, respectively, of the clamp upon a pipe;

Fig. 4 is a cross section through a pipe and through the clamp on an enlarged scale, the clamp being shown in its untightened position;

Figs. 5 and 6 are views taken in the direction of arrows 5—5 and 6—6, respectively, in Fig. 4; and Fig. 7 is a perspective view of one of the terminal lugs of the clamp.

Referring to the drawing in greater detail, there is shown a cylindrical tubing or pipe 10 of circular cross section having a patch clamp, which embodies this invention, wrapped around it, the clamp being designated generally by reference numeral 12. The pipe has a split 13 in it and the clamp is positioned upon the pipe to seal the split and thereby prevent leaking of the pipe.

The clamp comprises a band or strap 15 of thin sheet metal, e.g. stainless steel, the strap having an inside surface 16, outside surface 17, parallel side edges 18 and 19, and end edges 20 and 21. The strap has an appreciable width such that it will encircle the pipe as a longitudinally split sleeve to provide a gap 23 which becomes narrowed as the strap is tightened around the pipe.

A sheet 25 of elastomer material is disposed between the strap and the pipe to cover the pipe split. The elastomer sheet may be bonded or otherwise suitably adhered to the inside surface of the strap between the strap ends whereby the gap 23 will be disposed opposite the leak when the clamp is arranged around the pipe. There are two terminal draft lugs 27 and 28 for the clamp and there is a tightener, preferably in the form of a bolt 30, which spans the gap 23 and engages the two lugs for drawing the lugs toward each other to tighten the strap and press the elastomer sheet against the outside surface of the pipe.

Lug 27 comprises a foot portion 32 and a leg portion 33, the leg portion extending in a direction radially outwardly from the foot portion with respect to the pipe. Foot portion 32 is preferably of a length substantially equal to the width of the strap. It has an inside or near edge 35, hereinafter sometimes called the toe of the foot portion, and an outer or remote edge 36, hereinafter sometimes called the heel of the foot portion.

An end portion of the strap, i.e. the strap portion contiguous end edge 20, has an opening 38 formed therein for the leg portion 33. The leg portion extends through the opening when the lug is attached to the strap by bringing the strap over an outside surface 40 of the foot portion and thence over the toe edge and under the inside surface 41 of the foot portion. The foot portion has a projection 43 extending out from its inside surface, such projection, for the illustrated embodiment, extending as a ridge longitudinally of the foot portion and throughout the length thereof. Except for the projection 43, the foot portion is somewhat elliptical in cross section, taken in a plane normal to the axis of the pipe, the longer diameter of such elliptical cross-sectional form being that which extends in a direction circumferentially of the pipe, and the shorter diameter being aligned generally radially of the pipe. The projection 43 functions as a fulcrum for the lug as will be explained hereinafter. Optimum results are had in a clamp in which the apex of the projection 43 is spaced from the toe of the foot portion by a distance of about two-thirds of the dimension between the toe edge and the heel edge. The projection of the illustrated embodiment is not an abrupt one and is not distinct from the undersurface 41 of the foot portion, but instead it emerges gradually into the undersurface to make the forward and rearward portions of the undersurface of concave configuration, the degree of curvature of which approximates that of the pipe, it being understood that the larger sized lugs are to be employed on larger sized pipes.

The straps extends under the foot portion from over the toe edge beyond the projection whereby, as best seen in Fig. 6 of the drawing, the lug will fulcrum along a pivot line 45 where the band initially engages the outside surface of the pipe under the projection 43 as the bolt is clinched up in tightening the strap. The surfaces and edges of the foot portion are made smooth and rounded to allow the straps to be wrapped around it without making any sharp kinks or bends in the strap.

Leg portion 33 of lug 27 is integral with the foot portion and extends out from the leg portion intermediate the ends of the leg portion. The leg portion has an opening 47 extending therethrough for receiving the bolt. The illustrated embodiment is adapted to be supplied for use with the bolt being extended through the opening 47, a nut 49 and a washer 50 for the bolt being on the bolt whereby when it is desired to position the clamp around the pipe, the strap may be wrapped around the pipe and the bolt then engaged with the other terminal lug 28 as will be explained more fully hereinafter.

The bolt 30, being a conventional carriage bolt and thus having a straight shank 52, it will be apparent to those skilled in the art that for optimum tightening pressures the bolt should extend in a direction tangentially of the pipe throughout the tightening operation. It is an important feature of this invention that the remote side 54 of the terminal lug is arcuate or convex whereby as the bolt is tightened by turning its nut on the screw-threaded portion of the shank of the bolt, the washer 50 will slide tangentially on the surface 54 toward the foot portion of the lug. A bridge portion 55 of the lug closes the opening 47 in the outer end of the lug, the opening being of greater diameter, measured radially with respect to the pipe, than the shank of the bolt thus to accommodate inward or downward movement of the bolt in the opening as the bolt is being tightened.

Referring now to the details of construction of the terminal lug 28, it has a foot portion 32' which corresponds in size and form to the foot portion 32 of lug 27. The leg portion of lug 28, which, as before, extends out from between the ends of the foot portion, differs from the leg portion 33 of lug 27 in that it has no bridge 55, but instead extends up as two leg parts 57 and 58 which are spaced apart by an open slot 59.

It is preferred to employ a bolt of the carriage bolt type having an out-of-round, e.g. square, neck portion 61 at a head 62 of the bolt, whereby the neck portion will be received between the leg parts 57 and 58 to prevent turning of the bolt on its axis when the nut is turned on the bolt. The remote sides 64 of the leg parts are curved similarly as the remote surface 54 of lug 27 thus to permit tangential sliding of the inside surface of the bolt head upon the surface 64 as the bolt is tightened. Projections 66 on the leg parts of lug 28 serve to maintain the bolt in the slot 59 when the clamp is loose on the pipe.

From the above it will be apparent that as the bolt is tightened, it will cause the two terminal lugs to slide toward each other upon the outside surface of the pipe, thus narrowing the gap 23 and causing the lugs to fulcrum on their respective pivot projections inwardly toward each other with the inside surfaces of the bolt head and the bolt washer sliding tangentially along the arcuate surfaces 64 and 54 whereby there will be no moments of force tending to bend the bolt. The strap will be anchored with respect to the terminal lugs between the fulcrum projections of the lugs and the outside surface of the pipe. Rotational movement of the lugs will continue until the pipe surface is engaged by the strap portions under the toes of the lugs. It should be noted, too, that inward rotation of the lugs not only relieves binding and bending of the bolt but also raises the heels of the lugs to tighten the strap.

While the instant invention has been shown and described herein, in what is conceived to be the most practical and preferred embodiment, it is recognized that departures may be made therefrom within the scope of the invention, which is therefore not to be limited to the details disclosed herein, but is to be accorded the full scope of the claims.

What I claim is:

1. A clamp for encircling an object comprising a strap having end portions and adapted to be wrapped around the object to be clamped, terminal lugs attached to respective end portions of the strap, each lug comprising a foot portion and a leg portion extending outwardly from the foot portion, tightener means engageable with said leg portions for drawing the lugs toward each other to tighten the strap around the object, said foot portion having a fulcrum projection extending in a direction opposite to that of the leg portion whereby tightening of the strap imparts an inwardly directed moment of force upon the lugs with the lugs pivoting on their respective projections.

2. A clamp according to claim 1, in which said projection extends substantially throughout the length of the foot portion transversely of the strap and is disposed generally centrally of the inside surface of the foot portion.

3. A patch clamp for closing a leak in a pipe comprising a strap having opposite end portions and adapted to be wrapped around the pipe, a sheet of elastomer material on the inside surface of the strap for covering said leak, terminal lugs attached to respective end portions of the strap, each lug comprising a foot portion and a leg portion extending outwardly from the foot portion, tightener means engageable with said leg portions for drawing the lugs toward each other to tighten the strap around the pipe, said foot portion having a fulcrum projection extending in a direction opposite to that of the leg portion whereby tightening of the strap imparts an inwardly directed moment of force upon the lugs with the lugs fulcruming on their respective projections.

4. A clamp for encircling a pipe comprising a strap having end portions and adapted to be wrapped around the pipe with a gap existing between the end portions, two terminal lugs having a foot portion and a leg portion, the end portions of the strap being wrapped around the foot portions respectively with the leg portions extending through the strap whereby the lugs are disposed on opposite sides of the gap and the leg portions have near and remote surfaces with respect to each other, the remote surfaces being curved outwardly from each other on respective axes extending in a direction transversely of the strap, said leg portions having mutually aligned openings formed therein, a bolt having a shank, a head and a nut, the leg openings being adapted to loosely receive the bolt with the bolt head bearing against one of said remote surfaces and the bolt nut operatively associated with the other remote surface whereby the bolt will slide tangentially on said remote surfaces as the bolt is tightened to draw the lugs toward each other, said foot portions having a fulcrum projection integral therewith and extending inwardly of the lugs in a direction opposite to that of the leg portions whereby tightening of the bolt imparts an inwardly directed moment of force upon the lugs with the lugs pivoting on their respective projections.

5. A clamp according to claim 4, in which the strap extends under the projections thereby to anchor the ends of the strap with respect to the lugs when the clamp is tightened around the pipe.

6. A clamp according to claim 4, in which the foot portion of each lug has a thickness taken in a direction normal to the leg portion which is longer than that taken in the direction of the leg portion whereby as the lugs are pivoted on their respective projections they will lift the strap in those portions thereof which lie over the remote edges of the foot portions.

7. A pipe patch clamp for closing a leak in a pipe comprising a strap having end portions and adapted to be wrapped around the pipe with a gap existing between the end portions, a sheet of elastomer material upon the inside surface of the strap for covering said leak, two terminal lugs having a foot portion and a leg portion, the foot portions having a longer dimension taken in a direction circumferentially of the pipe than in a direction radially of the pipe, the end portions of the strap being wrapped around the foot portions respectively with the leg portions extending through the strap whereby the lugs are disposed on opposite sides of the gap and the leg portions have near and remote surfaces with respect to each other, the remote surfaces being curved outwardly from each other on respective axes extending in a direction transversely of the strap, said leg portions having mutually aligned openings formed therein, a bolt having a shank, a head and a nut, the leg openings being adapted to loosely receive the bolt with the bolt head bearing against one of said remote surfaces and the bolt nut operatively associated with the other remote surface whereby the bolt will slide tangentially on said remote surfaces as the bolt is tightened to draw the lugs toward each other, said foot portions having a fulcrum projection integral therewith and extending inwardly of the lugs in a direction opposite to that of the leg portions whereby tightening of the bolt imparts an inwardly directed moment of force upon the lugs with the lugs pivoting on their respective projections.

8. A pipe patch clamp according to claim 7, in which one lug opening completely encircles the bolt shank while the other lug opening is an open slot to permit insertion and removal of the bolt from engagement with one lug.

9. A clamp according to claim 8, in which the slotted lug has a stop projection on it for engagement with the bolt when the clamp is disposed loose around the pipe.

References Cited in the file of this patent

UNITED STATES PATENTS

| | | |
|---|---|---|
| 1,618,234 | Skinner | Feb. 22, 1927 |
| 2,908,061 | Adams | Oct. 13, 1959 |